United States Patent [19]
Zander

[11] Patent Number: 5,988,894
[45] Date of Patent: Nov. 23, 1999

[54] GUIDE ARRANGEMENT FOR FACILITATING INSERTION OF FILM LEADER INTO EASY-LOAD CAMERA

[75] Inventor: Dennis R. Zander, Penfield, N.Y.

[73] Assignee: Eastman Kodak Company, Rochester, N.Y.

[21] Appl. No.: 09/136,221

[22] Filed: Aug. 19, 1998

[51] Int. Cl.$^6$ ..................................................... G03B 17/24
[52] U.S. Cl. ........................................... 396/415; 396/538
[58] Field of Search .................................... 396/415, 538, 396/440, 535

[56] References Cited

U.S. PATENT DOCUMENTS 5,630,189  5/1997  Siekierski et al. .

*Primary Examiner*—David M. Gray
*Attorney, Agent, or Firm*—Roger A. Fields

[57] ABSTRACT

An easy-load camera comprising a cartridge receiving chamber for receiving a film cartridge with a protruding film leader that has one longitudinal edge extending straight from a reduced-width forward-most leader portion to a full-width leader portion following the reduced-width leader portion and an opposite longitudinal edge extending curved from the reduced-width leader portion to the full-width leader portion, and a leader insertion slot for first receiving the reduced-width leader portion and then receiving the full-width leader portion when the film leader is inserted into the leader insertion slot, is characterized in that an inclined film edge guide is located between the cartridge receiving chamber and the leader insertion slot to contact the longitudinal edge that extends curved from the reduced-width leader portion to the full-width leader portion, but only at the reduced-width leader portion and not at the full-width leader portion, when the film leader is inserted into the leader insertion slot, and a non-inclined film edge guide is located between the cartridge receiving chamber and the leader insertion slot to contact the longitudinal edge that extends straight from the reduced-width leader portion to the full-width leader portion, first at the reduced-width leader portion and then at full-width leader portion, when the film leader is inserted into the leader insertion slot.

7 Claims, 6 Drawing Sheets

GUIDE ARRANGEMENT FOR FACILITATING INSERTION OF FILM LEADER INTO EASY-LOAD CAMERA

CROSS REFERENCE TO RELATED APPLICATIONS

Reference is made to commonly assigned copending applications Ser. No. 09/017,940, entitled GUIDE ARRANGEMENT FOR FACILITATING INSERTION OF FILM LEADER INTO EASY-LOAD CAMERA and filed Feb. 3, 1998 in the name of Timothy J. Fuss.

FIELD OF THE INVENTION

The invention relates generally to the field of photography, and in particular to cameras intended for use with a film cartridge having a protruding film leader. More specifically, the invention relates to a guide arrangement for facilitating manual insertion of the film leader into a leader insertion slot inside the camera.

BACKGROUND OF THE INVENTION

A conventional 35 mm type film cartridge has a protruding film leader. One longitudinal edge of the film leader extends straight from a reduced-width forward-most portion of the film leader to a full-width portion of the film leader which follows the reduced-width leader portion. An opposite longitudinal edge of the film leader extends curved from the reduced-width leader portion to the full-width leader portion.

When loading a 35 mm type film cartridge into a conventional camera, a rear door of the camera is widely opened to uncover the rear interior of the camera body including a cartridge receiving chamber, a film-exposure backframe opening, and an exposed film take-up chamber. Then, the film cartridge with the protruding film leader manually held straightened, i.e. uncurled, is placed in the cartridge receiving chamber, the full-width leader portion is positioned over the backframe opening, and the reduced-width leader portion is placed in the take-up chamber.

By contrast, when loading a 35 mm type film cartridge into a so-called "easy-load" camera, such as disclosed in prior art U.S. Pat. No. 5,630,189 issued May 13, 1997, a rear door of the camera is opened only to uncover the cartridge receiving chamber and a leader insertion slot adjacent the cartridge receiving chamber. Then, the protruding film leader beginning with the reduced-width leader portion and followed by the full-width leader portion is inserted into the leader insertion slot. And last, the film cartridge is placed in the cartridge receiving chamber.

THE CROSS-REFERENCED APPLICATION

The cross-referenced application discloses an easy-load camera including a guide arrangement located to facilitate movement of the film leader towards the backframe opening as the film leader is advanced from the leader insertion slot. According to the invention, the guide arrangement has a pair of leader guide surfaces, a first one of which is configured to guide a curled corner segment of the reduced-width leader portion, and a second one of which is configured to guide the longitudinal edge segment curved from the reduced-width leader portion to the full-width leader portion.

SUMMARY OF THE INVENTION

An easy-load camera comprising a cartridge receiving chamber for receiving a film cartridge with a protruding film leader that has one longitudinal edge extending straight from a reduced-width forward-most leader portion to a full-width leader portion following the reduced-width leader portion and an opposite longitudinal edge extending curved from the reduced-width leader portion to the full-width leader portion, and a leader insertion slot for first receiving the reduced-width leader portion and then receiving the full-width leader portion when the film leader is inserted into the leader insertion slot, is characterized in that:

an inclined film edge guide is located between the cartridge receiving chamber and the leader insertion slot to contact the longitudinal edge that extends curved from the reduced-width leader portion to the full-width leader portion, but only at the reduced-width leader portion and not at the full-width leader portion, when the film leader is inserted into the leader insertion slot; and a non-inclined film edge guide is located between the cartridge receiving chamber and the leader insertion slot to contact the longitudinal edge that extends straight from the reduced-width leader portion to the full-width leader portion, first at the reduced-width leader portion and then at full-width leader portion, when the film leader is inserted into the leader insertion slot.

DETAILED DESCRIPTION OF THE INVENTION

The invention is disclosed as being embodied preferably in a camera. Because the features of a camera are generally well known, the description which follows is directed in particular only to those elements forming part of or cooperating directly with the disclosed embodiment. It is to be understood, however, that other elements may take various forms known to a person of ordinary skill in the art.

Figure 1:
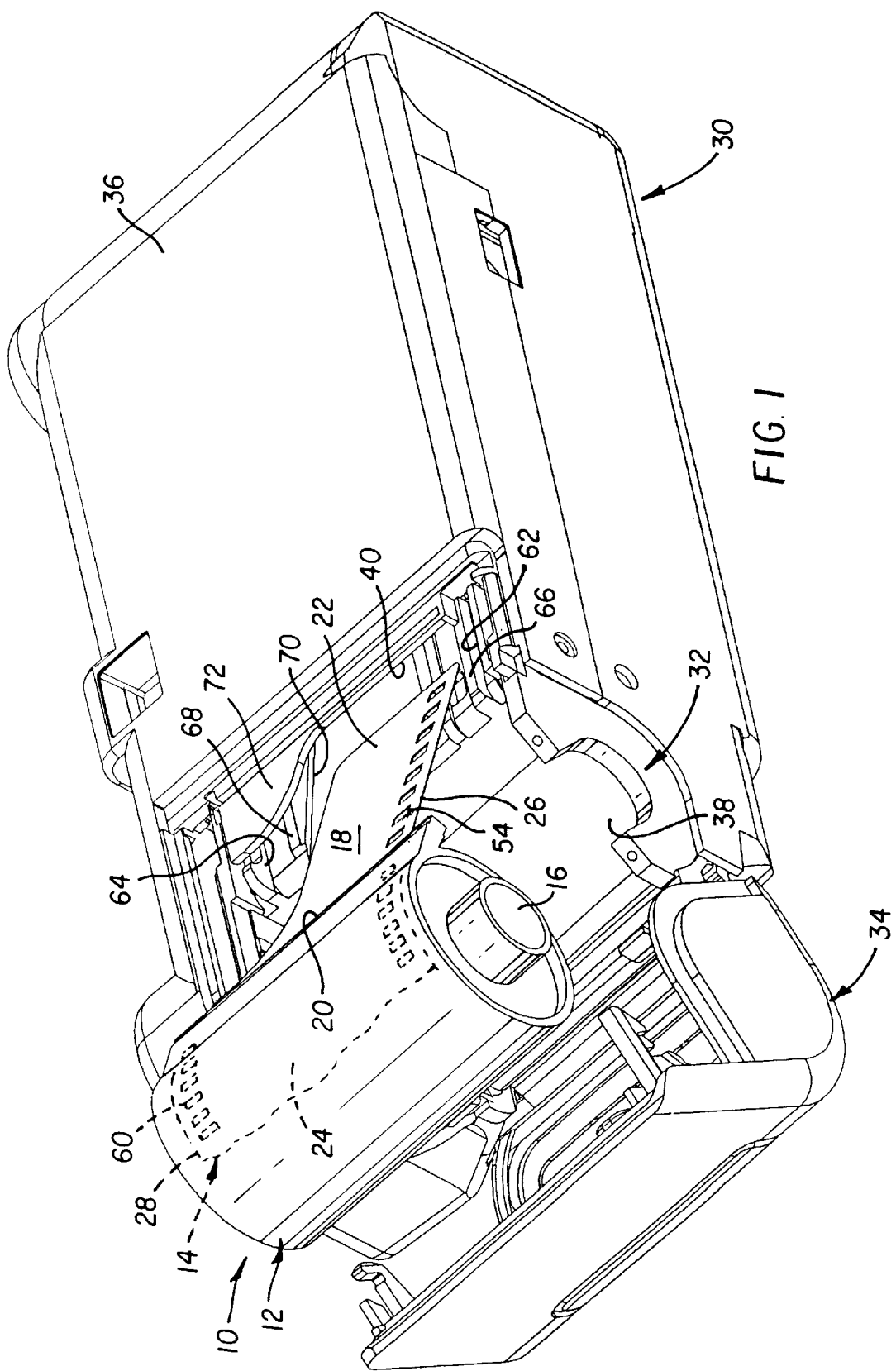
FIG. 1 is a rear perspective view of an easy-load camera according to a preferred embodiment of the invention, showing the manner in which a film cartridge with a protruding film leader is loaded into the camera.

Referring now to the drawings, FIG. 1 shows a conventional 35 mm type film cartridge 10 comprising a light-tight housing 12 and an unexposed filmstrip 14. The filmstrip 14 is wound in a roll on a rotatable spool 16 inside the housing 12 and has a film leader 18 that protrudes from the housing through a light-trapping slot 20 in the housing. The film leader 18 has a reduced-width forward-most portion 22 and a full-width portion 24 that immediately follows the reduced-width portion and is the same width as the remainder of the filmstrip 14. One longitudinal edge 26 of the filmstrip 14 extends straight from the reduced-width leader portion 22 to the full-width leader portion 24. An opposite longitudinal edge 28 of the filmstrip 14 partially extends curved from the reduced-width leader portion 22 to the full-width leader portion 24 and then continues straight along the full-width leader portion.

Figure 2:
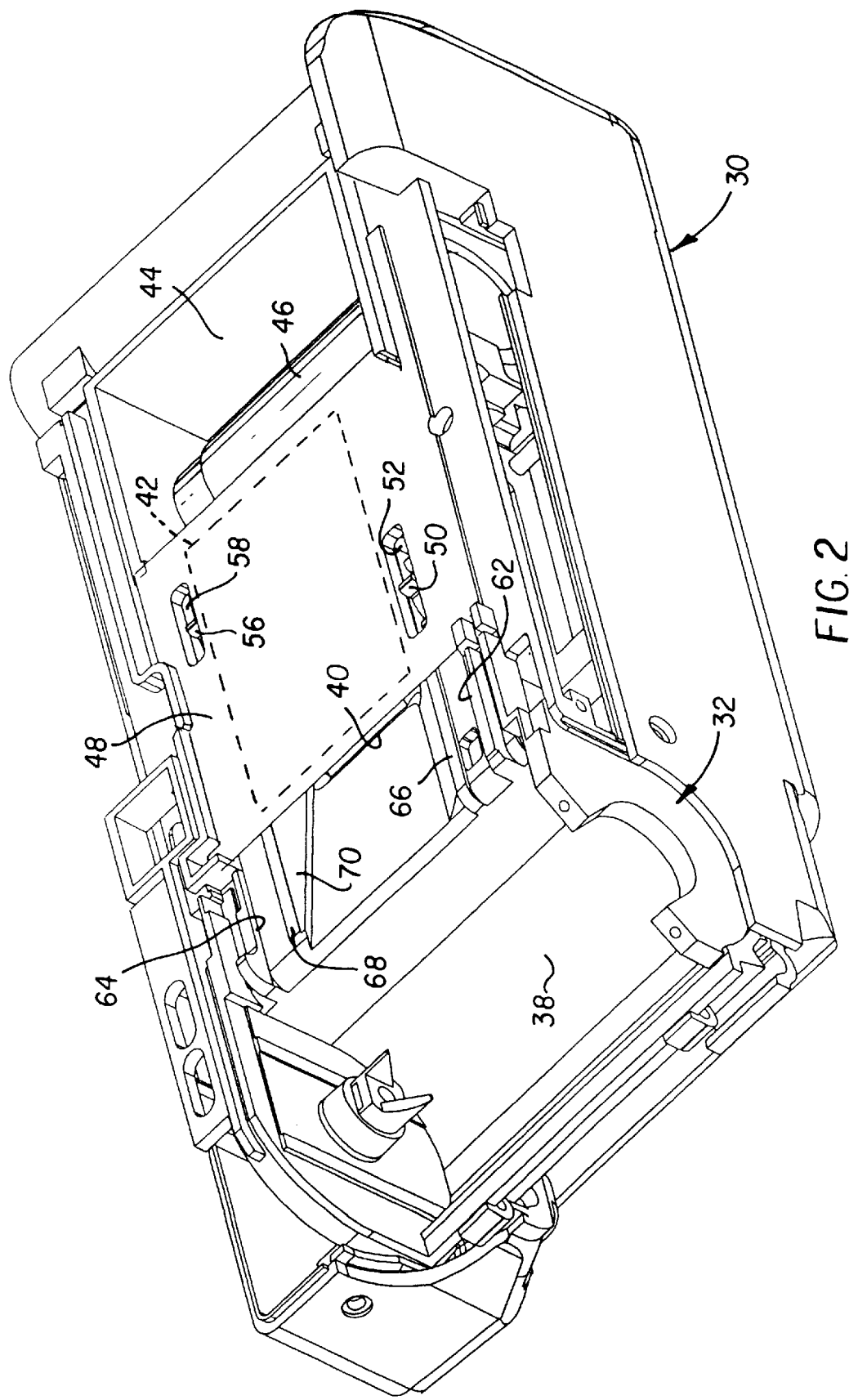
FIG. 2 is a rear perspective view of the easy-load camera, shown with a fixed back removed for illustration purposes.
Figure 3:
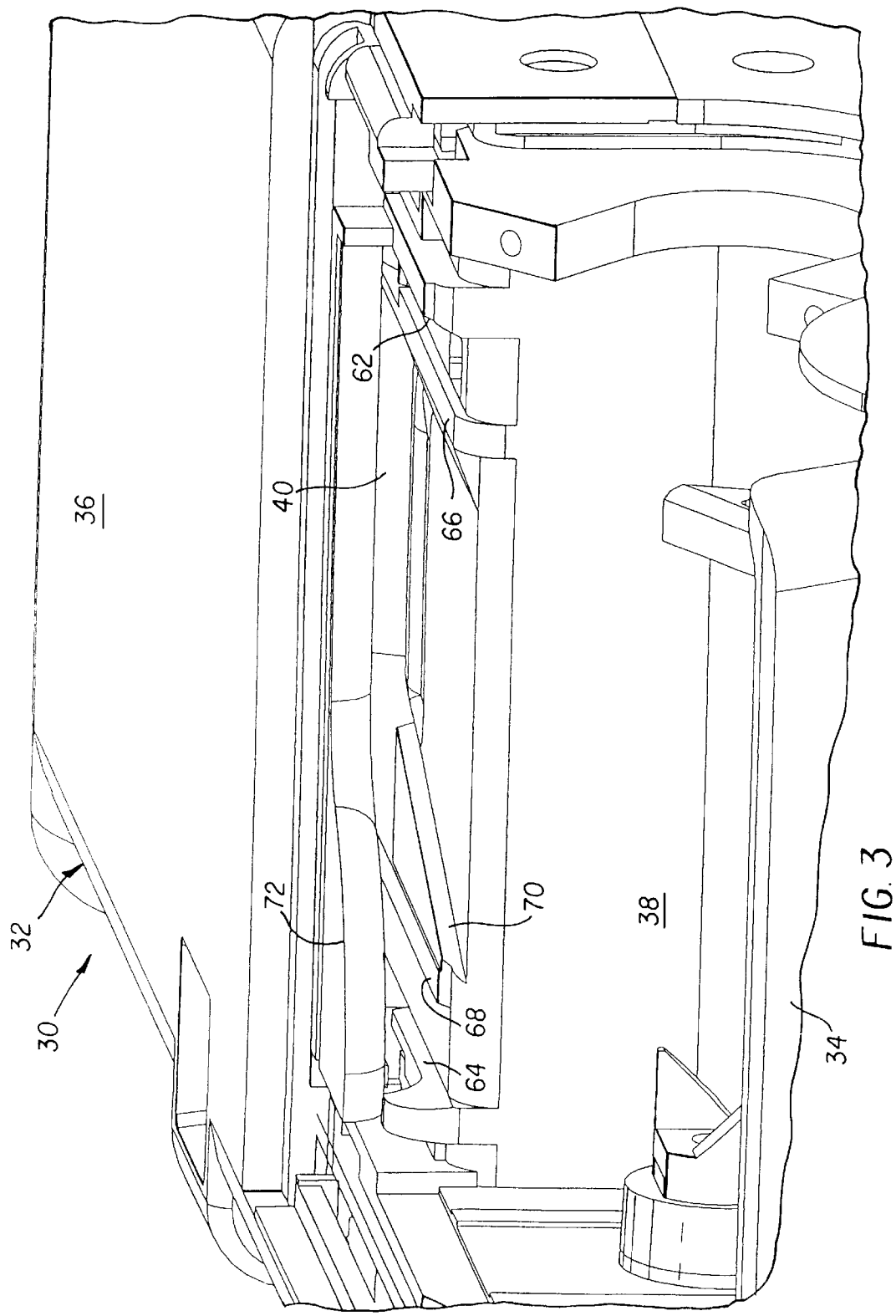
FIG. 3 is an enlarged rear, end perspective view of the easy-load camera.

As can be seen in FIG. 1, an easy-load camera 30 intended for use with the film cartridge 10 comprises a camera body 32 and a pivotal rear end door 34. The camera body 32 has a fixed back 36 which is removed in FIG. 2 for illustration purposes, a cartridge receiving chamber 38, a light-trapping leader insertion slot 40, a film-exposure backframe opening 42, and an exposed film take-up chamber 44. The leader insertion slot 40, the film-exposure backframe opening 42, and the exposed film take-up chamber 44 are located beneath the fixed back 36. The cartridge receiving chamber 38 is located beneath the door 34. An exposed film take-up spool 46 is rotatably supported within the exposed film take-up chamber 44. A film platen 48 is spring supported between the fixed back 36 and the backframe opening 42. Alternatively, the film platen 48 can be rigidly supported. See FIG. 2. A known film drive/film metering sprocket wheel 50 protrudes through an opening 52 in the film platen 48 for engaging the filmstrip 14 beginning with the reduced-width leader portion 22 at successive film perforations 54 adjacent the longitudinal film edge 26. A known exposure counter sprocket wheel 56 protrudes through an opening 58 in the film platen 48 for engaging the filmstrip 14 beginning with the full-width leader portion 24 at successive film perforations 60 adjacent the longitudinal film edge 28.

As shown in FIGS. 1–6, a pair of parallel non-inclined film edge guides 62 and 64 are spaced apart along the camera body 32, from adjacent the cartridge receiving chamber 38 to adjacent the exposed film take-up chamber 44, a non-varying distance that is substantially the same as (very slightly greater than) the width of the filmstrip 14, except for the reduced-width leader portion 22, in order to contact the filmstrip 14 at its longitudinal film edges 26 and 28 to prevent transverse movement of the filmstrip. A pair of known film rails 66 and 68 parallel to, and substantially coextensive with, the non-inclined film edge guides 62 and 64 are located between those film edge guides. An inclined film edge guide 70 extends between the film rail 68 and the non-inclined film edge guide 62 from adjacent the cartridge receiving chamber 38 to the leader insertion slot 40.

The fixed back 36 has a substantially flat blocking projection 72 that extends partially over the film rail 68 and farther over the non-inclined film edge guide 64. See FIGS. 1 and 3–6. Alternatively, the film platen 48 can include the blocking projection. An ample space exists between the blocking projection 72 and both the film rail 68 and the non-inclined film edge guide 64 to allow the filmstrip 14 to fit into the space in order to contact the film rail and non-inclined film edge guide.

Operation

When the rear-end door 34 is pivoted open, it uncovers the cartridge receiving chamber 38, the non-inclined film edge guides 62 and 64, the film rails 66 and 68, the inclined film edge guide 70, and the blocking projection 72. See FIGS. 1, 3 and 4. Thus, between the cartridge receiving chamber 38 and the leader insertion slot 40, only the non-inclined film edge guide 64 and the film rail 68 remain covered to some extent (by the blocking projection 72).

Figure 4:
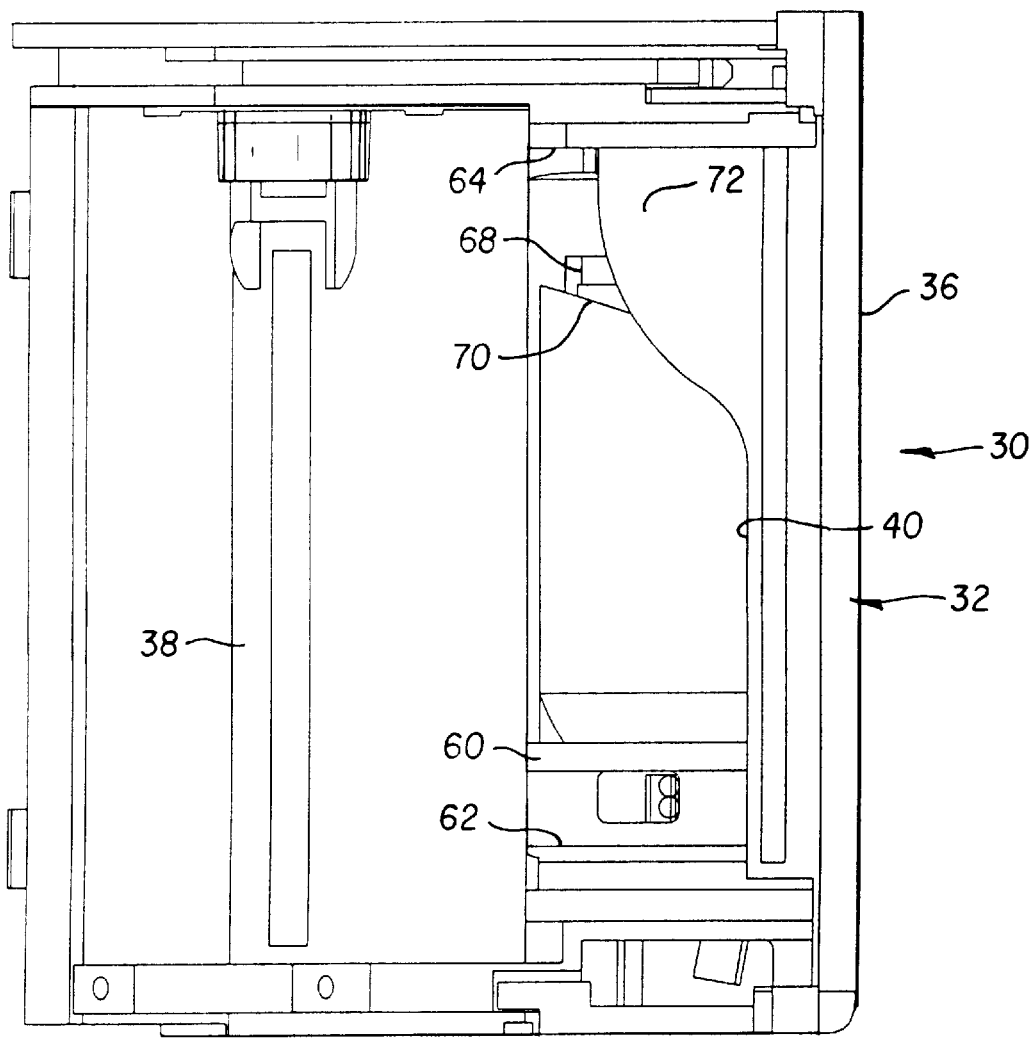
FIG. 4 is an enlarged rear plan view of the easy-load camera.

To begin film loading, the film cartridge 10 is positioned opposite the cartridge receiving chamber 38 as shown in FIG. 1, and the reduced-width leader portion 22 is moved towards the leader insertion slot 40. The longitudinal film edge 28—at the reduced-width leader portion 22—contacts the inclined film edge guide 70, and the inclined film edge guide then acts to guide the reduced-width leader portion laterally to cause the longitudinal film edge 26—at the reduced-width leader portion—to contact the non-inclined film edge guide 62 as shown in FIG. 4. The blocking projection 72 tends to deter the longitudinal film edge 28—at the reduced-width leader portion 22—from being placed in contact with the non-inclined film edge guide 64.

Figure 5:
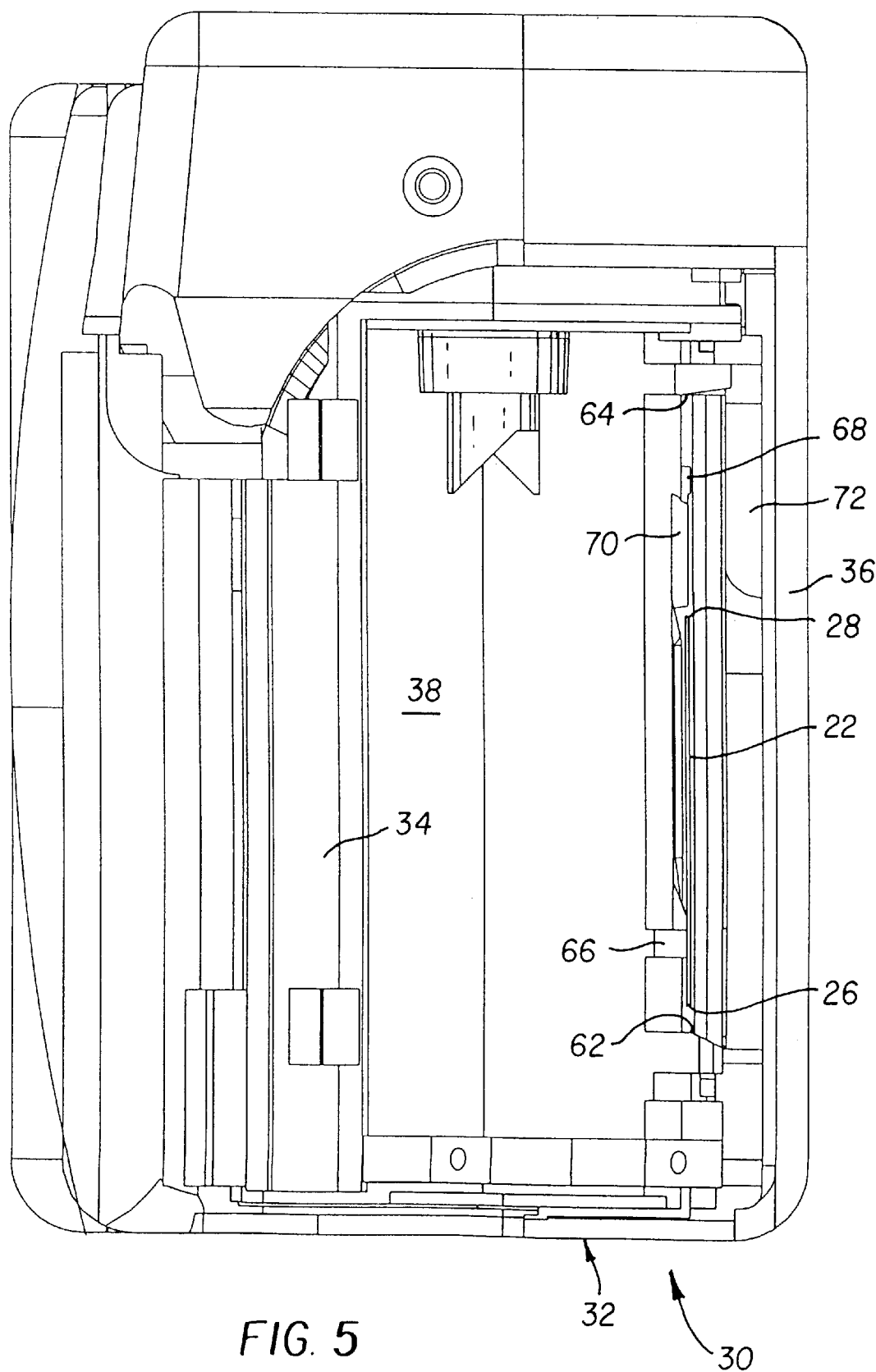
FIGS. 5 and 6 are elevation end views of the easy-load camera, showing progressive insertion of the film leader into a leader insertion slot.
Figure 6:
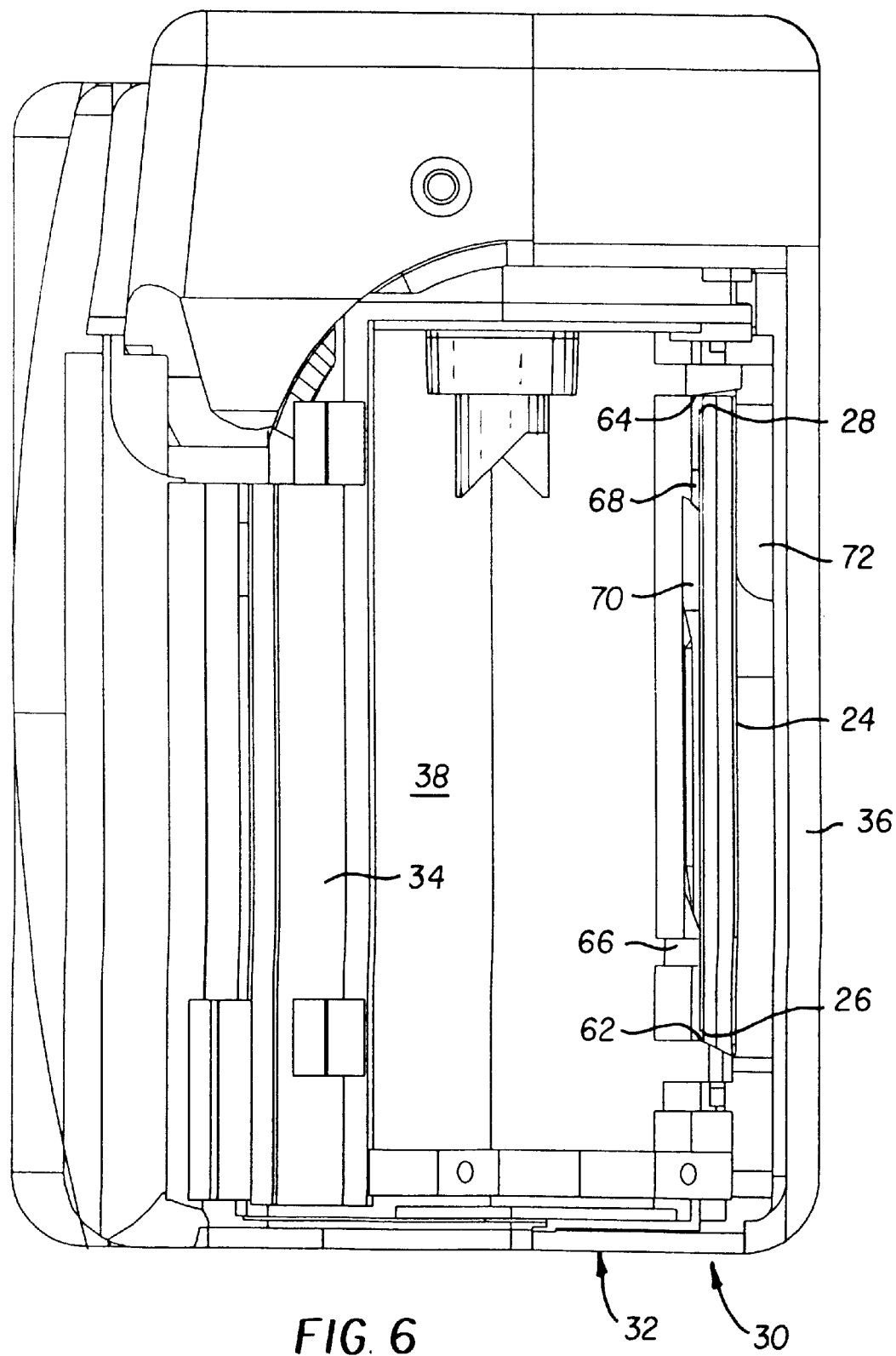

When the reduced-width leader portion 22 is manually advanced sufficiently through the leader insertion slot 40, the longitudinal film edge 28—at the full-width leader portion 24—contacts the non-inclined film edge guide 64 as shown in FIG. 5. Simultaneously, the longitudinal film edge 26—at the full-width leader portion—contacts the non-inclined film edge guide 62. The full-width leader portion 24 now covers the inclined film edge guide 70 as shown in FIG. 5.

Finally, the film cartridge 10 is placed in the cartridge receiving chamber 38, and the rear-end door 34 is then pivoted closed.

Initially, the sprocket wheel 50 is motor driven to advance the film leader 18 onto the take-up spool 46. Simultaneously, the take-up spool 46 is motor driven to cinch the film leader 18 to the take-up spool. When the film leader 18 is cinched to the take-up spool 46, the resulting film tension between the take-up spool and the film cartridge 10 activates a clutch (not shown) to discontinue motor driving the sprocket wheel 46. The sprocket wheel 46 then operates as a film driven metering device. The sprocket wheel 56 is always film driven.

The invention has been described with reference to a preferred embodiment. However, it will be appreciated that variations and modifications can be effected by a person of ordinary skill in the art without departing from the scope of the invention.

PARTS LIST 10. film cartridge
12. housing
14. filmstrip
16. spool
18. film leader
20. slot
22. forward-most leader portion
24. full-width leader portion
26. longitudinal film edge
28. longitudinal film edge
30. easy-load camera
32. body
34. door
36. back
38. cartridge receiving chamber
40. leader insertion slot
42. backframe opening
44. film take-up chamber
46. film take-up spool
48. film platen
50. film drive/film metering sprocket wheel
52. opening
54. film perforations
56. exposure counter sprocket wheel
58. opening
60. film perforations
62. non-inclined film edge guide
64. non-inclined film edge guide
66. film rail
68. film rail
70. inclined film edge guide
72. blocking projection

What is claimed is:

1. An easy-load camera comprising a cartridge receiving chamber for receiving a film cartridge with a protruding film leader that has one longitudinal edge extending straight from a reduced-width forward-most leader portion to a full-width leader portion following the reduced-width leader portion and an opposite longitudinal edge extending curved from the reduced-width leader portion to the full-width leader portion, and a leader insertion slot for first receiving the reduced-width leader portion and then receiving the full-width leader portion when the film leader is inserted into said leader insertion slot, is characterized in that:

an inclined film edge guide is located between said cartridge receiving chamber and said leader insertion slot to contact the longitudinal edge that extends curved from the reduced-width leader portion to the full-width leader portion, but only at the reduced-width leader portion and not at the full-width leader portion, when the film leader is inserted into said leader insertion slot; and a non-inclined film edge guide is located between said cartridge receiving chamber and said leader insertion slot to contact the longitudinal edge that extends straight from the reduced-width leader portion to the full-width leader portion, first at the reduced-width leader portion and then at full-width leader portion, when the film leader is inserted into said leader insertion slot.

2. An easy-load camera as recited in claim 1, wherein said inclined film edge guide and said non-inclined film edge guide are spaced from one another a varying distance which is less than the width of the full-width leader portion.

3. An easy-load camera as recited in claim 2, wherein said inclined film edge guide is located between said non-inclined film edge guide and an opposite film edge guide that extends parallel to the non-inclined film edge guide between said cartridge receiving chamber and said leader insertion slot and is spaced from the non-inclined film edge guide a non-varying distance which is substantially the same as the width of the full-width leader portion.

4. An easy-load camera as recited in claim 3, wherein respective film rails extend parallel to one another and are located between said inclined film edge guide and said non-inclined film edge guide and between the inclined film edge guide and said opposite film edge guide.

5. An easy-load camera as recited in claim 3, wherein a blocking projection extends sufficiently over said opposite film edge guide to deter that film edge guide from contacting the reduced-width leader portion at the longitudinal edge that extends curved from the reduced-width leader portion to the full-width leader portion, when the film leader is inserted into said leader insertion slot, and leaves said inclined film edge guide and said non-inclined film edge guide uncovered sufficiently to permit them to contact the reduced-width leader portion at the longitudinal edge that extends curved from the reduced-width leader portion to the full-width leader portion and at the longitudinal edge that extends straight from the reduced-width leader portion to the full-width leader portion, when the film leader is inserted into said leader insertion slot.

6. An easy-load camera as recited in claim 3, wherein a rear door is supported to be opened to uncover said cartridge receiving chamber and said inclined and non-inclined film edge guides, and a fixed blocking member permanently covers said opposite film edge guide, but leaves a space between said blocking member and that film edge guide.

7. A method of loading into an easy-load camera a film cartridge with a protruding film leader that has one longitudinal edge extending straight from a reduced-width forward-most leader portion to a full-width leader portion following the reduced-width leader portion and an opposite longitudinal edge extending curved from the reduced-width leader portion to the full-width leader portion, said method comprising the steps of:

positioning the longitudinal edge that extends curved from the reduced-width leader portion to the full-width leader portion, at the reduced-width leader portion, against an inclined film edge guide that is located between a cartridge receiving chamber and a leader insertion slot;

positioning the longitudinal edge that extends straight from the reduced-width leader portion to the full-width leader portion, at the reduced-width leader portion, against a non-inclined film edge guide that is located between the cartridge receiving chamber and the leader insertion slot; and then inserting the film leader beginning at the reduced-width leader portion into the leader insertion slot in a way that permits the longitudinal edge that extends curved from the reduced-width leader portion to the full-width leader portion, at the full-width leader portion, to come to rest against an opposite film edge guide that extends parallel to the non-inclined film edge guide between the cartridge receiving chamber and the leader insertion slot; and then positioning the film cartridge in the cartridge receiving chamber.

* * * * *